Sept. 28, 1937.   G. A. LYON   2,094,324
FENDER WELL TIRE COVER WITH LATERALLY OPERATIVE ATTACHING MEANS
Filed April 1, 1931   2 Sheets-Sheet 1
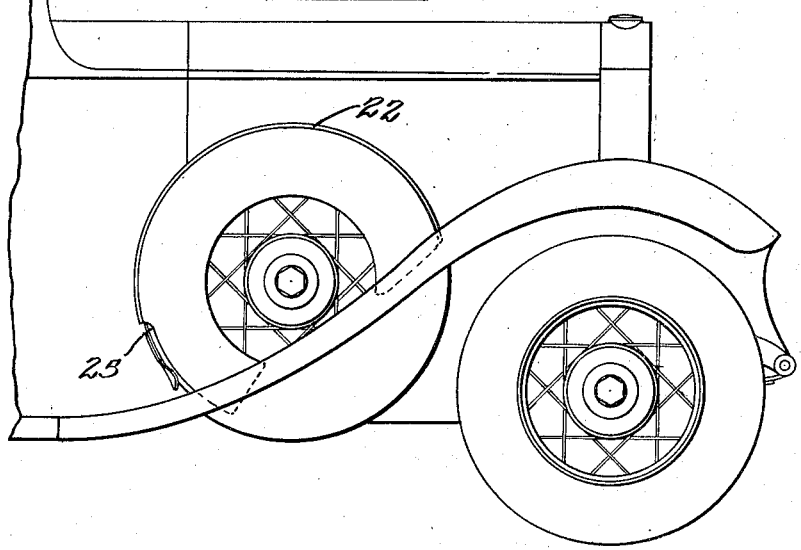
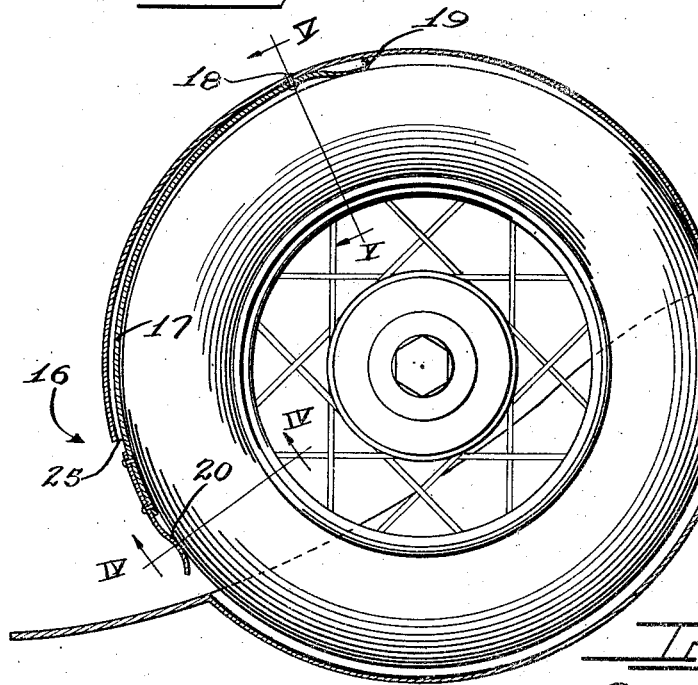
Inventor
George Albert Lyon.
By Charles W. Hills Attys.

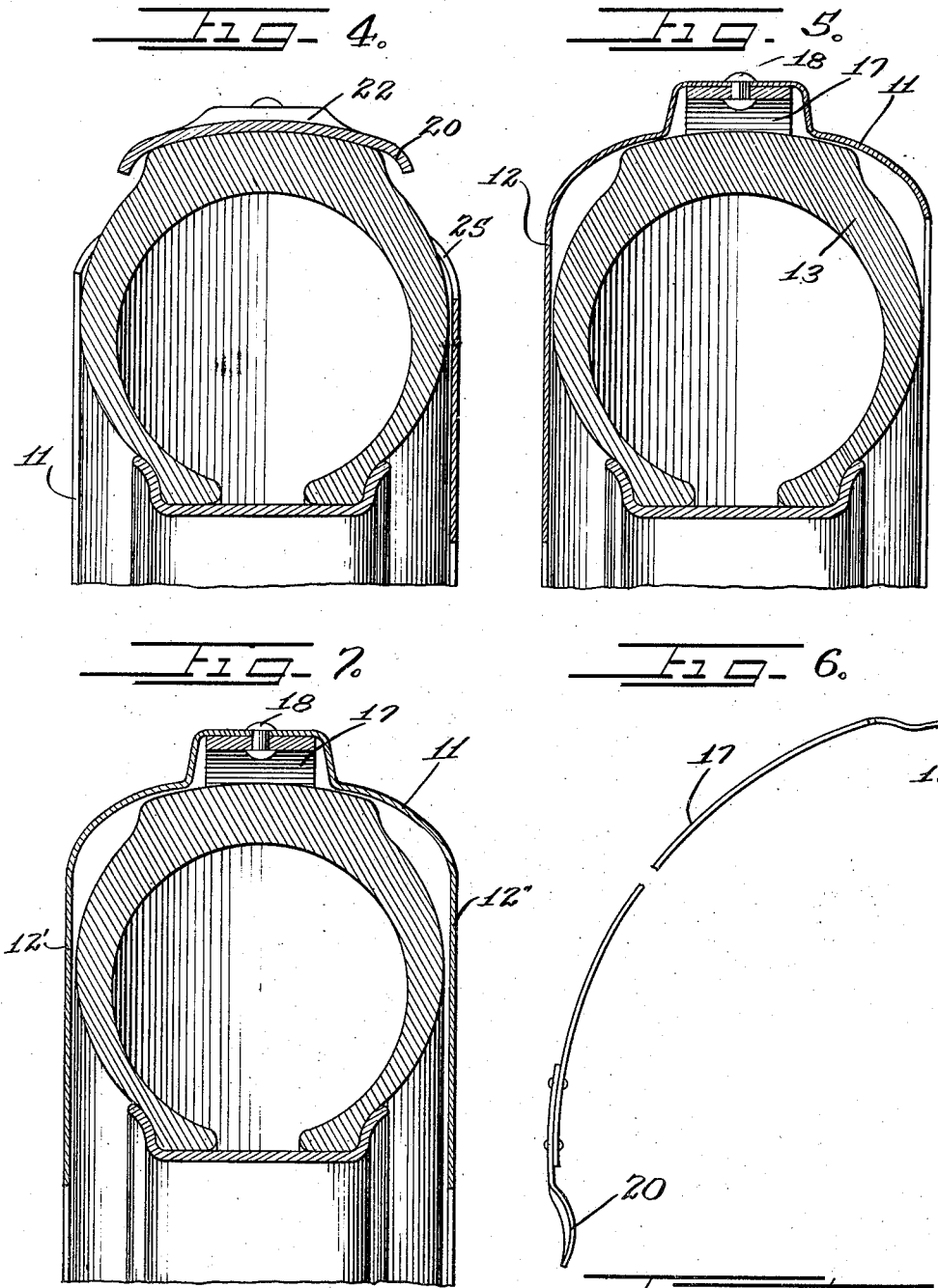

Patented Sept. 28, 1937

2,094,324

UNITED STATES PATENT OFFICE 2,094,324

FENDER WELL TIRE COVER WITH LATERALLY OPERATIVE ATTACHING MEANS

George Albert Lyon, Allenhurst, N. J., assignor to Lyon, Incorporated, Asbury Park, N. J., a corporation of Delaware Application April 1, 1931, Serial No. 526,879

7 Claims. (Cl. 150—54)

My present invention relates to tire covers and more particularly to a tire cover for a spare tire disposed in the fender well of an automotive vehicle.

The object of this invention is to provide improved means for detachably securing a tire cover in proper tire protecting position on a spare tire in a fender well or the like.

In accordance with the general features of this invention there is provided on a tire cover for a spare tire disposed in a fender well of an automobile and extending more than half way about the circumference of the tire, including a rim portion for covering the tread or outer periphery of the tire and resilient spring means disposed beneath said rim portion for yieldably engaging the periphery of the tire to hold the cover in proper tire protecting position thereon.

Other objects and advantages of this invention will more fully appear from the following detailed description taken in connection with the accompanying drawings in which:

Figure 1 is a side view of the forward part of a motor vehicle showing my tire cover applied to the spare tire disposed in a fender well of the vehicle;

Figure 2 is a vertical sectional view taken through the cover and fender well illustrated in Figure 1 and showing in detail the manner in which the leaf spring means yieldably coacts with the periphery of the tire to hold the cover in proper position thereon;

Figure 3 is an end view of the tire cover shown in Figure 1 taken from the left side of the cover and illustrating the construction of the lowermost end of the leaf spring clamping means;

Figure 4 is a cross sectional view taken on the line IV—IV of Figure 2;

Figure 5 is a cross-sectional view taken on the line V—V of Figure 2;

Figure 6 is a detailed view of the leaf spring by itself; and

Figure 7 is a cross sectional view similar to Figure 5 but illustrating a slightly modified form of tire cover in which the cover has two side portions for covering both side walls of the tire.

The preferred form of tire cover illustrated in the accompanying drawings comprises a rim portion 11 and a side plate portion 12. The rim portion 11 is circular in form and is adapted to cover the outer periphery or tread of the spare tire 13 and the plate portion 12 is formed to cover the outer side wall of the tire 13. This cover as best shown in Figures 1 and 2 does not extend clear around the entire circumference of the tire but merely extends around a little more than one-half of the circumference of the tire so as to cover the portion of the tire extending above the fender well 15.

However, it is to be noted that the cover should extend around at least slightly more than one-half of the periphery of the tire so that the resilient clamping means designated generally by the reference character 16 may be effective to clamp the cover to the tire against accidental upward displacement of the cover therefrom.

The yieldable clamping means 16 is illustrated as being in the form of a leaf spring 17 (Figure 6) which is curved in shape. This spring is disposed on the inner side of the rim portion 11 of the cover and overlies a portion of the tread of a spare tire to which the cover is applied. One end of the spring is secured to the cover by means of a rivet 18. This end of the spring is also provided with a laterally curved offset portion 19 for taking up any play between the top of the tire and the cover at the upper end of the spring. The lower end of the spring has secured to it an enlarged shoe portion 20 for yieldably engaging the tread of the tire at a point in the circumference of the tire which is below the upper half enclosed by the tire cover.

Referring to Figures 3 and 5 it is to be noted that the rim portion 11 of the tire is provided with an outwardly depressed section 22 in which the leaf spring 17 is disposed. Furthermore, as indicated at 25 in Figures 1 and 2, a lower part of the rim portion 11 is cut away so as to permit the shoe 20 on the lower end of the leaf spring to have free play in its flexing movement as the cover is shoved onto the tire.

In the use of this tire cover, the spare tire may be first placed in the fender well 15 of the automotive vehicle and then the cover may be shoved downwardly onto the exposed top and side wall of the tire. Needless to say the resiliency of the spring and its shoe 17 enables the shoe as the same passes over the tread of the tire to flex outwardly and then inwardly toward the tire whereby the cover is yieldably clamped against rattling on the tire. Since the shoe 20 is disposed below the greatest width of the cover, which width is substantially the same as the diameter of the tire, the shoe is enabled to become effective to hold the cover on the upper half of the tire to which it is applied.

In Figure 7 there is illustrated a slightly modified form of cover in which the rim portion 11' has two side wall portions 12' and 12" instead of one side wall as is the case with the preferred form of the device. The remaining structure in the modified form of cover is substantially identical with that of the preferred form.

Now I desire it understood that although I have illustrated and described in detail the preferred embodiment of this invention, the invention is not to be thus limited but only insofar as defined by the scope and spirit of the appended claims.

I claim as my invention:

1. In a tire cover having its bottom formed open and with spaced ends and adapted to be shoved onto a tire, means for yieldably clamping the cover to the tire in proper tire protecting position disposed between the peripheral portion of the cover and the peripheral portion of the tire underlying the former portion, said means extending beyond an end of the cover to retain the cover on the tire against accidental upward displacement.

2. In a tire cover including a rim portion and a side plate portion for extending about more than one-half the circumference of the tire, yieldable means between the rim portion and the tire at one end of the cover for yieldably clamping the cover in proper tire protecting position on the tire and extending circumferentially about the tire beyond the upper half of the tire encompassed by the cover.

3. In a tire cover including a rim portion and a side plate portion for extending about more than one-half the circumference of the tire, yieldable means between the rim portion and the tire at one end of the cover for yieldably clamping the cover in proper tire protecting position on the tire, said yieldable means comprising a leaf spring disposed over the tread of the tire having one end anchored to the rim portion of the cover and having its other end formed to yieldably flex back and forth as the cover is shoved into position on the tire whereby said latter end of the leaf spring will thereafter engage the tread of the tire so as to hold the cover thereon.

4. In a tire cover including a rim portion and a side plate portion for extending about more than one-half the circumference of the tire, yieldable means between the rim portion and the tire at one end of the cover for yieldably clamping the cover in proper tire protecting position on the tire, said yieldable means comprising a leaf spring disposed over the tread of the tire having one end anchored to the rim portion of the cover and having its other end formed to yieldably flex back and forth as the cover is shoved into position on the tire whereby said latter end of the leaf spring will thereafter engage the tread of the tire so as to hold the cover thereon, said upper and other end of the leaf spring being also provided with a curved offset portion for preventing play between the cover and the top of the tire for enabling a contact point between the cover intermediate its ends and the tread of the tire.

5. In a tire cover adapted to be shoved onto a tire, means for yieldably clamping the cover to the tire in proper tire protecting position disposed between the peripheral portion of the cover and the peripheral portion of the tire underlying the former portion, said yieldable means including a leaf spring extending circumferentially about the tire tread and fastened at one end to the cover and having its lower end provided with a shoe for yieldably engaging the tread of the tire and for holding the cover in proper position on the tire and against accidental upward displacement.

6. In combination with a spare tire in a well of an automobile, of an open bottom cover for the tire adapted to cooperate with the well in forming a closure for the tire, including portions for covering the exposed outer side and tread of the tire, and means for causing the cover to tightly hug the tire at one end of the cover comprising a spring inside an end of the open bottom cover, said spring having a portion for resiliently engaging the tire, and being supported by said cover to pivot about a point located inside of the cover.

7. A tire cover comprising a substantially rigid member for covering the face of the tire and clamping means carried by said member and so shaped and positioned as to automatically engage the tread portion of the tire as the cover is moved toward tire enclosing position and then automatically engage the tread portion at two points and clamp the cover in position as the cover is moved "home" into final position.

GEORGE ALBERT LYON.